(12) United States Patent
Du et al.

(10) Patent No.: US 9,742,502 B2
(45) Date of Patent: Aug. 22, 2017

(54) INTERACTION METHODS AND SYSTEMS

(71) Applicant: Beijing Zhigu Rui Tuo Tech Co., Ltd, Beijing (CN)

(72) Inventors: Lin Du, Beijing (CN); Lei Pan, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/304,513

(22) PCT Filed: Mar. 12, 2015

(86) PCT No.: PCT/CN2015/074061
§ 371 (c)(1),
(2) Date: Oct. 15, 2016

(87) PCT Pub. No.: WO2015/158189
PCT Pub. Date: Oct. 22, 2015

(65) Prior Publication Data
US 2017/0041084 A1 Feb. 9, 2017

(30) Foreign Application Priority Data
Apr. 16, 2014 (CN) .......................... 2014 1 0153860

(51) Int. Cl.
*H04B 5/00* (2006.01)
*H04B 13/00* (2006.01)
(Continued)

(52) U.S. Cl.
CPC ........... *H04B 13/005* (2013.01); *G06F 1/163* (2013.01); *G06F 3/011* (2013.01); *H04B 11/00* (2013.01)

(58) Field of Classification Search
None
See application file for complete search history.

(56) References Cited

U.S. PATENT DOCUMENTS

| 5,724,313 A | 3/1998 | Burgess et al. |
| 5,920,521 A | 7/1999 | Kromer et al. |

(Continued)

FOREIGN PATENT DOCUMENTS

| CN | 1215153 A | 4/1999 |
| CN | 1732491 A | 2/2006 |

(Continued)

OTHER PUBLICATIONS

International Search Report for PCT Application No. PCT/CN2015/074061, mailed Jun. 12, 2015, 3 pages.

*Primary Examiner* — Tuan A Tran
(74) *Attorney, Agent, or Firm* — Amin, Turocy & Watson, LLP

(57) ABSTRACT

The present application provides an interaction method and system, and relates to the field of information interaction. The method comprises: in response to contact between a user body and an object, receiving a wave signal that is sent by the object and is transmitted by using a medium comprising at least a part of the user body. The system comprises: a receiving apparatus, configured to: in response to contact between a user body and an object, receive a wave signal that is sent by the object and is transmitted by using a medium comprising at least a part of the user body. The interaction method and system can help a user to naturally and efficiently complete an information interaction process, simplify an interaction process, and improve the interaction efficiency.

19 Claims, 3 Drawing Sheets

(51) Int. Cl.
*G06F 3/01* (2006.01)
*G06F 1/16* (2006.01)
*H04B 11/00* (2006.01)

(56) References Cited

U.S. PATENT DOCUMENTS

| | | | |
|---|---|---|---|
| 6,441,721 | B1 | 8/2002 | Tajima et al. |
| 6,504,794 | B2 * | 1/2003 | Haase .................. G01S 3/8034 367/119 |
| 6,569,160 | B1 | 5/2003 | Goldin et al. |
| 6,720,984 | B1 | 4/2004 | Jorgensen et al. |
| 8,248,293 | B2 | 8/2012 | Kroning et al. |
| 9,220,477 | B2 | 12/2015 | Urabe et al. |
| 9,317,835 | B2 * | 4/2016 | Calman .................. G06Q 10/10 |
| 2003/0036696 | A1 | 2/2003 | Willis et al. |
| 2004/0267133 | A1 | 12/2004 | Odany |
| 2006/0139175 | A1 | 6/2006 | Cosier |
| 2009/0298447 | A1 * | 12/2009 | Kim ..................... H04B 13/005 455/127.1 |
| 2010/0045446 | A1 * | 2/2010 | Hyun ................... H04B 13/005 340/10.51 |
| 2010/0278008 | A1 | 11/2010 | Ammar |
| 2011/0182447 | A1 * | 7/2011 | Kim ....................... H04R 27/00 381/151 |
| 2011/0282623 | A1 | 11/2011 | Schneider et al. |
| 2012/0026129 | A1 * | 2/2012 | Kawakami ............ G06F 1/1643 345/174 |
| 2012/0146892 | A1 | 6/2012 | Hamada et al. |
| 2013/0093616 | A1 * | 4/2013 | Jeon ........................ G01S 7/412 342/118 |
| 2014/0343392 | A1 | 11/2014 | Yang |

FOREIGN PATENT DOCUMENTS

| | | | |
|---|---|---|---|
| CN | 101910865 A | | 12/2010 |
| CN | 102573649 A | | 7/2012 |
| CN | 102854978 A | | 1/2013 |
| CN | 103605423 A | | 2/2014 |
| CN | 103927009 A | | 7/2014 |
| CN | 103927013 A | | 7/2014 |
| JP | 2006292634 | * | 10/2006 ............. G01S 15/10 |
| JP | 2008197801 A | | 8/2008 |
| KR | 20100088849 A | | 8/2010 |
| WO | 2004059598 A1 | | 7/2004 |
| WO | 2013075270 A1 | | 5/2013 |
| WO | 2015158188 A1 | | 10/2015 |
| WO | 2015158189 A1 | | 10/2015 |

* cited by examiner

In response to contact between a user body and an object, receive a wave signal that is sent by the object and is transmitted by using a medium comprising at least a part of the user body —— S120

FIG. 1

In response to contact between a user body and an object, receive a wave signal that is sent by the object and is transmitted by using a medium comprising at least a part of the user body —— S120

Identify the object according to a signal characteristic of the received wave signal —— S140

FIG. 2

In response to contact between a user body and an object, receive a wave signal that is sent by the object and is transmitted by using a medium comprising at least a part of the user body —— S120

Identify the object according to a signal characteristic of the received wave signal —— S140

Perform a corresponding operation according to an identification result —— S160

FIG. 3

INTERACTION METHODS AND SYSTEMS

RELATED APPLICATION

The present application is a U.S. National Stage filing under 35 U.S.C. §371 of international patent cooperation treaty (PCT) application No. PCT/CN2015/074061, filed Mar. 12, 2015, and entitled "INTERACTION METHODS AND SYSTEMS", which claims the benefit of priority to Chinese Patent Application No. 201410153860.9, filed on Apr. 16, 2014, which applications are hereby incorporated into the present application by reference herein in their respective entireties.

TECHNICAL FIELD

The present application relates to the field of information interaction technologies, and in particular, to interaction methods and systems.

BACKGROUND

With the development of electronic devices, wearable devices are proposed by people, and are gradually being accepted by people. Wearable devices such as smart glasses, smart watches, and smart rings bring about great convenience for people's daily life.

Wearable devices usually have characteristics such as catering for users, compactness, portability, and low power consumption; however, because of these characteristics, wearable devices usually have a poor interaction capability.

SUMMARY

An example non-limiting objective of the present application is to provide natural and efficient interaction methods and systems.

According to an example aspect of at least one embodiment of the present application, an interaction method is provided, where the method comprises: in response to contact between a user body and an object, receiving a wave signal that is sent by the object and is transmitted by using a medium comprising at least a part of the user body.

According to another example aspect of at least one embodiment of the present application, an interaction system is provided, where the system comprises:

a receiving apparatus, configured to: in response to contact between a user body and an object, receive a wave signal that is sent by the object and is transmitted by using a medium comprising at least a part of the user body.

The various interaction methods and systems according to at least one embodiment of the present application can help a user to naturally and efficiently complete an information interaction process, simplify an interaction process, and/or improve the interaction efficiency.

BRIEF DESCRIPTION OF THE DRAWINGS

FIG. 1 is an example flowchart of an interaction method according to an embodiment of the present application;

FIG. 2 is an example flowchart of an example embodiment of an interaction method according to an embodiment of the present application;

FIG. 3 is an example flowchart of another example embodiment of an interaction method according to an embodiment of the present application;

DETAILED DESCRIPTION

Figure 4:
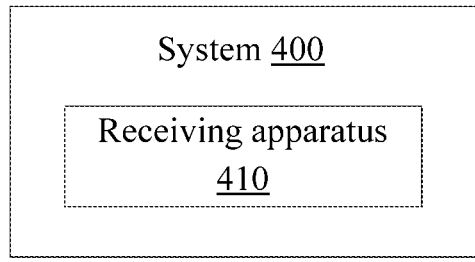
FIG. 4 is an example structural diagram of modules of an interaction system according to an embodiment of the present application.

Example embodiments of the present application are further described in detail with reference to accompanying drawings and embodiments. The following embodiments are used to describe the present application, but are not intended to limit the scope of the present application.

A person skilled in the art understands that sequence numbers of the following steps do not mean execution sequences in embodiments of the present application. The execution sequences of the steps should be determined according to functions and internal logic of the steps, and should not be construed as any limitation on the embodiments of the present application.

In one or more of the embodiments of the present application, a wave signal is a signal transmitted in a form of a wave. An ultrasonic wave is an acoustic wave and with frequency higher than 20000 Hz, the ultrasonic wave has desirable directivity and a strong penetration capability, and therefore, relatively concentrated sound energy is easily obtained. The ultrasonic wave has a long transmission distance in water, and around 65% of constituents of a human body are water; therefore, ultrasonic wave information is desirably transmitted by using a human body as a transmission medium. Besides, frequency of the ultrasonic wave is beyond the human hearing range; therefore, a user cannot perceive the existence of an ultrasonic wave signal, and consequently the user is not affected by noise. In addition, an electromagnetic wave signal with frequency lower than 100 MHz is also desirably transmitted through a human body, and is desirably applicable to the embodiments of the present application.

FIG. 1 is a flowchart of an interaction method according to an embodiment of the present application, where the interaction method may be implemented in, for example, an interaction system. As shown in FIG. 1, the method comprises:

S120: In response to contact between a user body and an object, receive a wave signal that is sent by the object and is transmitted by using a medium comprising at least a part of the user body.

In the method according to this embodiment of the present application, in response to contact between a user body and an object, a wave signal that is sent by the object and is transmitted by using a medium comprising at least a part of the user body is received, which can provide data support for obtaining related information of the object. In this way, in a process of contact between the user body and an external object, information interaction with the contacted object is naturally and efficiently completed.

Specifically, the object may periodically send the wave signal, for example, a domestic daily utensil (for example, a cup or a door handle) of a user sends the wave signal each second; or the object may send the wave signal as triggered by the user, for example, in response to pressing, by the user, a key, a domestic daily utensil of the user starts to send the wave signal.

The contact is not limited to direct contact, and also comprises indirect contact (for example, holding a mouse while wearing a glove) and a case in which a distance between the user body and a corresponding object is less than a preset distance (for example, 0.1 mm).

The user body may comprise clothes that the user wears, an accessory that the user wears, or the like, such as a glove that the user wears. The object may comprise non-life entities such as a desk, a cup, and a mouse, and may also comprise life entities such as a human body, an animal, and a tree.

The at least a part of the user body may be positions such as the head, the hand, and the leg of the user, and the at least a part of the user body is related to a position in which the user body contacts the object, for example, when a finger of the user contacts the object, the at least a part of the user body usually comprises the hand of the user. In consideration of frequency at which different positions of a human body contact an external object, the at least a part of the user body is more possibly a hand of the user, for example, a palm of the user or a finger of the user. Therefore, the wave signal is received on a hand of the user, which complies with a life habit of the user to a greater extent, and is more natural and efficient.

Referring to FIG. 2, in an example embodiment of the present application, the method may further comprise:

S140: Identify the object according to a signal characteristic of the received wave signal.

The inventor finds in researches that affected by a material, a texture, a shape, a size, a type, a structure, and the like that are intrinsic to an object, signal characteristics of a wave signal received after the same wave signal penetrates through different objects are obviously different. Therefore, in an example embodiment, a signal source may be disposed in (or above) each object, the signal source is made to transmit the same initial wave signal, and then the object is identified according to a signal characteristic, corresponding to a known object, of a wave signal and the signal characteristic of the received wave signal. The identifying the object according to a signal characteristic, corresponding to a known object, of a wave signal and the signal characteristic of the received wave signal may comprise:

S141: Create a classifier according to the signal characteristic, corresponding to the known object, of the wave signal.

S142: Perform a classification calculation according to the classifier and the signal characteristic of the received wave signal, and identify the object according to a calculation result.

The signal characteristic, corresponding to the known object, of the wave signal may be pre-determined by means of an experiment and pre-stored. For example, a manufacturer or the user pre-holds different objects, and separately records corresponding signal characteristics of the wave signal, so as to obtain the signal characteristic, corresponding to the known object, of the wave signal, where the signal characteristic, corresponding to the known object, of the wave signal may be stored in a device storage or a network server, so that the signal characteristic, corresponding to the known object, of the wave signal is invoked in actual use of the method.

In another example embodiment, signal sources in different objects may also be made to correspondingly send different initial wave signals, signal characteristics, corresponding to known objects, of wave signals are pre-obtained, and then the objects can also be identified according to signal characteristics of received wave signals.

In addition, the inventor finds in researches that if an initial wave signal is sent at a fixed position of a relatively large object, contact between the user body and different positions of the object also cause different signal characteristics of received wave signals. In this case, a specific position in which the user body contacts the object can be identified according to pre-obtained signal characteristics, corresponding to different positions of the object, of wave signals and a signal characteristic of a received wave signal.

Therefore, in step S140, the identifying the object may be directly obtaining a name of the object, for example, telling the user that a cup is currently held; may also be obtaining, by means of identification, attribute information such as a material, a texture, a shape, a size, a structure, and the like of the object, where the user can determine what the object is according to the attribute information; or may further be identifying a position in which the user body contacts the object.

The signal characteristic of the wave signal may be related to at least one of an amplitude, a phase, and a frequency spectrum of the wave signal. Specifically, the signal characteristic of the wave signal may comprise at least one of a fingerprint, an average value, and a difference, wherein the fingerprint may be formed by at least one of the amplitude of the wave signal, the phase of the wave signal, and the frequency spectrum of the wave signal; the average value may be an average value of at least one of the amplitude of the wave signal, the phase of the wave signal, and the frequency spectrum of the wave signal; and the difference may be a difference of at least one of the amplitude of the wave signal, the phase of the wave signal, and the frequency spectrum of the wave signal.

Referring to FIG. 3, in an example embodiment of the present application, the method may further comprise:

S160: Execute a corresponding operation according to an identification result.

The executing a corresponding operation may comprise switching a mode, inputting content, matching a device, prompting a user, and the like.

For example, in the case in which the identification result indicates that a hand of the user touches a steering wheel, a smart phone of the user may be controlled to switch to a driving mode; in this case, if receiving information, the smart phone may directly broadcast information by using a speech to improve driving safety.

Or, for example, during a game of the user, corresponding control instructions may be input according to identified keys of different shapes or identified different positions of the same key that the user contacts.

Or, for example, when the identification result indicates that a hand of the user contacts a Bluetooth headset, a smart phone of the user can be controlled to automatically match and establish a connection with the Bluetooth headset.

Or, in the case in which it is inconvenient for the user to observe, the user can be prompted according to the identification result. For example, in the case in which a blind user contacts a cup, the blind user may be prompted that a cup is currently contacted, and the user may be further prompted whether the cup has water.

In addition, an embodiment of the present application further provides a computer readable medium, which comprises a computer readable instruction that performs the following operations when being executed: executing the operation of step S120 of the method in the example embodiment shown in FIG. 1.

In conclusion, in the method according to this embodiment of the present application, a contacted object can be identified according to a signal characteristic of a received wave signal, and a corresponding operation such as switching a mode, inputting content, matching a device, and prompting a user can be performed according to an identification result. In this way, information interaction between a user and the object or a corresponding device is naturally and efficiently completed.

FIG. 4 is a schematic structural diagram of modules of an interaction system according to an embodiment of the present application, where the interaction system may be a wearable device such as a wrist strap or a ring.

As shown in FIG. 4, the interaction system 400 comprises:

a receiving apparatus 410, configured to: in response to contact between a user body and an object, receive a wave signal that is sent by the object and is transmitted by using a medium comprising at least a part of the user body.

In the system according to this embodiment of the present application, in response to contact between a user body and an object, a wave signal that is sent by the object and is transmitted by using a medium comprising at least a part of the user body is received, which can provide data support for obtaining related information of the object. In this way, in a process of contact between the user body and an external object, information interaction with the contacted object is naturally and efficiently completed.

Specifically, the object may periodically send the wave signal, for example, send the wave signal each second, or send the wave signal as triggered by a user, for example, send the wave signal in response to pressing, by the user, a key.

The contact is not limited to direct contact, and also comprises indirect contact (for example, holding a mouse while wearing a glove) and a case in which a distance between the user body and a corresponding object is less than a preset distance (for example, 0.1 mm).

The user body may comprise clothes that the user wears, an accessory that the user wears, or the like, such as a glove that the user wears. The object may comprise non-life entities such as a desk, a cup, and a mouse, and may also comprise life entities such as a human body, an animal, and a tree.

The at least a part of the user body, that is, a position related to a position in which the interaction system is worn, may be positions such as the head, the hand, and the leg of the user. In consideration of frequency at which different positions of a human body contact an external object, an interaction process is more natural and efficient when the interaction system is worn on the hand of the user, for example, the interaction system is worn in a position such as a wrist of the user or a finger of the user. Besides, to improve determining accuracy of the interaction system, a material such as silica gel or another flexible material that facilitates wave signal transmission may be provided between the interaction system and the user body.

Figure 5:
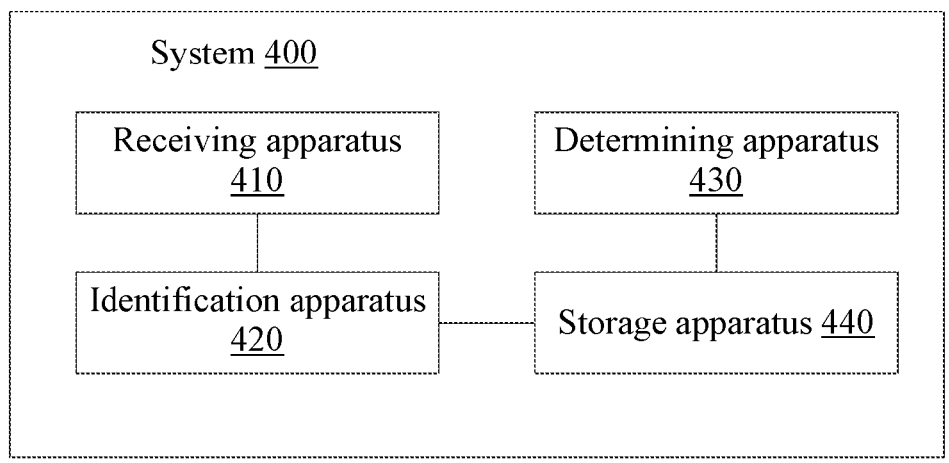
FIG. 5 is an example structural diagram of modules in an example embodiment of an interaction system according to an embodiment of the present application.

Referring to FIG. 5, in an example embodiment of the present application, the interaction system further comprises:

an identification apparatus 420, configured to identify the object according to a signal characteristic of the received wave signal.

The inventor finds in researches that affected by a material, a texture, a shape, a size, a type, a structure, and the like of an object, signal characteristics of the same wave signal received after the wave signal penetrates through different objects are obviously different. Therefore, in an example embodiment, a signal source may be disposed in (or above) each object, the signal source is made to transmit the same initial wave signal, and then the object is identified according to a signal characteristic, corresponding to a known object, of a wave signal and the signal characteristic of the received wave signal.

The signal characteristic, corresponding to the known object, of the wave signal may be pre-determined by means of an experiment and pre-stored. For example, a manufacturer or a user pre-holds different objects, and separately records corresponding signal characteristics of the wave signal, so as to obtain the signal characteristic, corresponding to the known object, of the wave signal, where the signal characteristic, corresponding to the known object, of the wave signal may be stored in a device storage or a network server, so that the correspondence is invoked in actual use of the method. Correspondingly, referring to FIG. 5, the interaction system 400 may further comprise:

a determining apparatus 430, configured to pre-determine the signal characteristic, corresponding to the known object, of the wave signal; and a storage apparatus 440, configured to pre-store the signal characteristic, corresponding to the known object, of the wave signal.

In another example embodiment, signal sources in different objects may also be made to correspondingly send different initial wave signals, signal characteristics, corresponding to known objects, of wave signals are pre-obtained, and then the objects can also be identified according to signal characteristics of received wave signals.

In addition, the inventor finds in researches that if an initial wave signal is sent at a fixed position of a relatively large object, contact between the user body and different positions of the object also cause different signal characteristics of received wave signals. In this case, in another example embodiment, a specific position in which the user body contacts the object can further be identified according to pre-obtained signal characteristics, corresponding to different positions of the object, of wave signals and a signal characteristic of a received wave signal.

Therefore, the identifying, by the identification apparatus 420, the object may be directly obtaining a name of the object, for example, telling the user that a cup is currently held; may also be obtaining, by means of identification, attribute information such as a material, a texture, a shape, a size, a structure, and the like of the object, where the user can determine what the object is according to the attribute information; or may further be identifying a position in which the user body contacts the object.

The signal characteristic of the wave signal may be related to at least one of an amplitude, a phase, and a frequency spectrum of the wave signal. Specifically, the signal characteristic of the wave signal may comprise at least one of a fingerprint, an average value, and a difference, wherein the fingerprint may be formed by at least one of the amplitude, the phase, and the frequency spectrum of the wave signal; the average value may be an average value of at least one of the amplitude, the phase, and the frequency spectrum of the wave signal; and the difference may be a difference of at least one of the amplitude, the phase, and the frequency spectrum of the wave signal.

Figure 6:
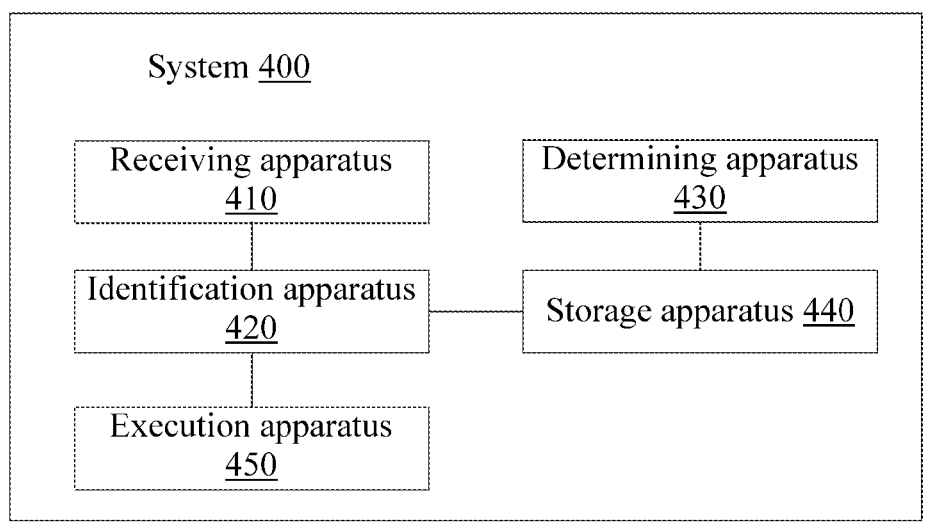
FIG. 6 is an example structural diagram of modules in another example embodiment of an interaction system according to an embodiment of the present application.

Referring to FIG. 6, in an example embodiment of the present application, the system 400 may further comprise:

an execution apparatus 450, configured to execute a corresponding operation according to an identification result.

The executing a corresponding operation may comprise switching a mode, inputting content, matching a device, prompting a user, and the like.

For example, in the case in which the identification result indicates that a hand of the user touches a steering wheel, the system 400 may control a smart phone of the user to switch to a driving mode; in this case, if receiving information, the smart phone may directly broadcast information by using a speech to improve driving safety.

Or, for example, during a game of the user, the system 400 may input corresponding control instructions according to identified keys of different shapes or identified different positions of the same key that the user contacts.

Or, for example, in the case in which the identification result indicates that a hand of the user contacts a Bluetooth headset, the system 400 may control a smart phone of the user to automatically match and establish a connection with the Bluetooth headset.

Or, in the case in which it is inconvenient for the user to observe, the system 400 may prompt the user according to the identification result. For example, in the case in which a blind user contacts a cup, the blind user may be prompted that a cup is currently contacted, and the user may be further prompted whether the cup has water.

Figure 7:
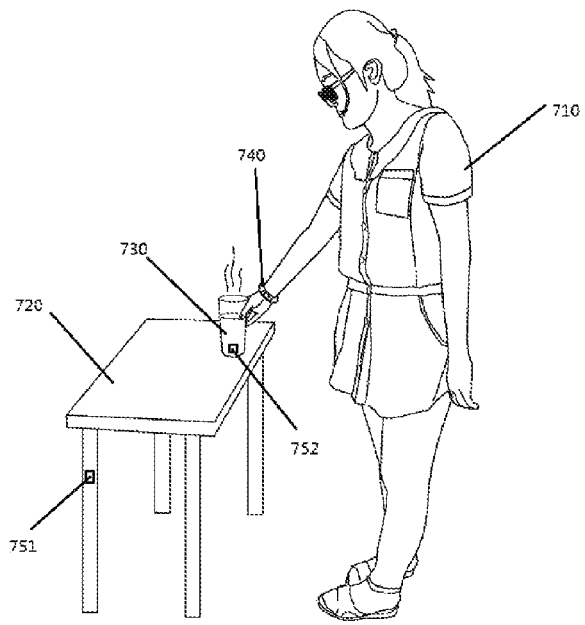
FIG. 7 is an example schematic diagram of an application scenario of an interaction system according to an embodiment of the present application.

FIG. 7 is a schematic diagram of an application scenario of an interaction system according to an embodiment of the present application. As shown in FIG. 7, a user 710 is a blind person, and wants to find a cup 730 on a table 720 to drink water. When a finger of the user 710 contacts the table 720, a wrist strap 740 worn on a wrist of the user 710 receives a wave signal sent by a first signal transmitter 751, further identifies that an object that the user currently contacts is the table 720, and prompts the user that the table 720 is currently contacted. Then, the user 710 continues to grope on the table 720; when a finger of the user 710 contacts the cup 730, the wrist strap 740 receives a wave signal sent by a second signal transmitter 752, further identifies that an object that the user currently contacts is the cup 730, and prompts the user that the cup 730 is currently contacted.

The first signal transmitter 751 and the second signal transmitter 752 may use a surface mounting structure to facilitate attachment to an object surface, and certainly the first signal transmitter 751 and the second signal transmitter 752 may also be respectively embedded in the table 720 and the cup 730. In addition, in the case in which the user 710 contacts the table 720, the wrist strap 740 may further identify and prompt the user 710 whether the table surface or a table leg is currently contacted; in the case in which the user 710 contacts the cup 730, the wrist strap 740 may further identify and prompt the user 710 whether the cup 730 has water, so that the user 710 conveniently drink.

In conclusion, in the system according to this embodiment of the present application, an object can be identified according to a signal characteristic of a received wave signal, and a corresponding operation such as switching a mode, inputting content, matching a device, and prompting a user can be performed according to an identification result. In this way, information interaction between a user and the object or a corresponding device is naturally and efficiently completed.

Figure 8:
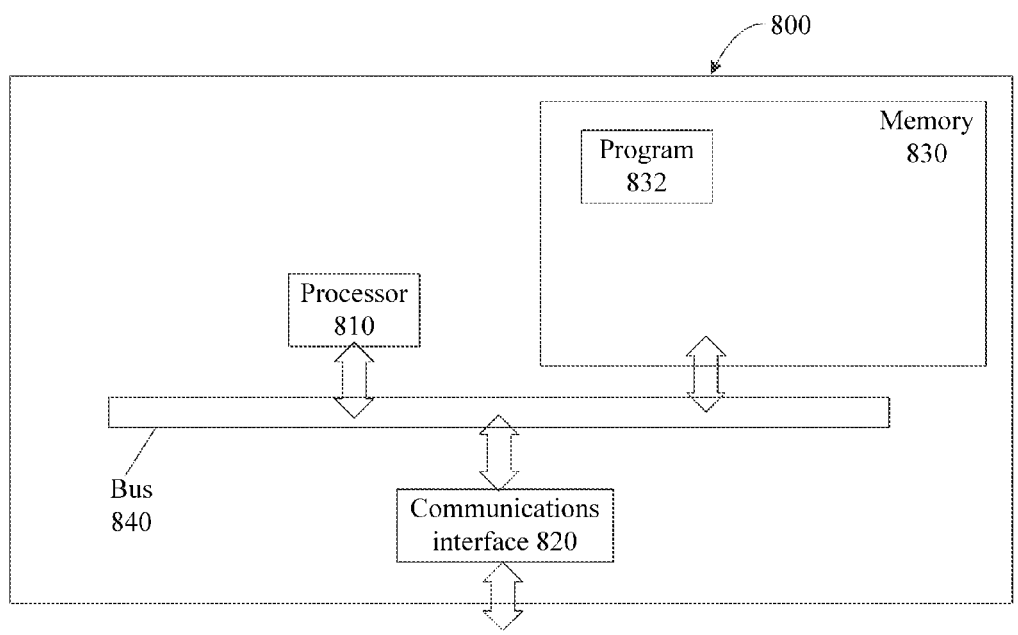
FIG. 8 is an example structural diagram of hardware of an interaction system according to an embodiment of the present application.

A hardware structure of an interaction system according to an embodiment of the present application is shown in FIG. 8. A specific embodiment of the present application is not intended to limit a specific implementation of the interaction system. Referring to FIG. 8, the interaction system 800 may comprise:

a processor 810, a communications interface 820, a memory 830, and a communications bus 840.

The processor 810, the communications interface 820, and the memory 830 complete communication with each other by using the communications bus 840.

The communications interface 820 is configured to communicate with another network element.

The processor 810 is configured to execute a program 832, and specifically can execute related steps in the method embodiments shown in FIG. 1 to FIG. 3.

Specifically, the program 832 may comprise program code, and the program code comprises a computer operation instruction.

The processor 810 may be a central processing unit (CPU), an application specific integrated circuit (ASIC), or one or more integrated circuits configured to implement the embodiments of the present application.

The memory 830 is configured to store the program 832. The memory 830 may comprise a high-speed RAM memory, and may also comprise a non-volatile memory, for example, at least one magnetic disk memory. The program 832 can specifically perform the following steps:

in response to contact between a user body and an object, receiving a wave signal that is sent by the object and is transmitted by using a medium comprising at least a part of the user body.

For specific implementations of steps in the program 832, reference may be made to related steps or modules in the foregoing embodiments, which are not described herein again. It may be clearly understood by a person skilled in the art that, for the purpose of a convenient and brief description, for specific working processes of the foregoing devices and modules, reference may be made to corresponding process descriptions in the foregoing method embodiments, which are not described herein again.

A person of ordinary skill in the art may be aware that, the exemplary units and method steps described in the embodiments disclosed in this specification may be implemented by electronic hardware, or a combination of computer software and the electronic hardware. Whether the functions are performed in a hardware manner or a software manner depends on particular applications and design constraint conditions of the technical solutions. A person skilled in the art may use different methods to implement the described functions for each particular application, but the implementation shall not be construed as exceeding the scope of the present application.

When the functions are implemented in a form of a software functional unit, and are sold or used as an independent product, the functions may be stored in a computer readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or a part of the steps of the method described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are only for the purpose of describing the present application, and are not intended to limit the present application. A person of ordinary skill in the art may make various changes and variations without departing from the spirit and scope of the present application; therefore, any equivalent technical solution falls within the scope of the present application, and the patent protection scope of the present application shall be defined by claims.

What is claimed is:

1. A method, comprising:
   in response to contact between a user body and an object, receiving, by a system comprising a processor, a wave signal from a signal source disposed in the object that is transmitted using a medium comprising at least a part of the user body; and
   identifying the object according to a signal characteristic of the received wave signal and another signal characteristic, corresponding to a known object, of another received wave signal from a signal source disposed in the known object, wherein signal sources disposed in the object and the known object transmit a same initial wave signal, and the signal characteristic is affected by propagation of the wave signal through at least a portion of the object.

2. The method of claim 1, wherein at least the part of the user body comprises a user hand.

3. The method of claim 1, further comprising:
   pre-storing the other signal characteristic, corresponding to the known object, of the other received wave signal.

4. The method of claim 1, further comprising:
   pre-determining the other signal characteristic, corresponding to the known object, of the other received wave signal.

5. The method of claim 1, further comprising:
   executing a corresponding operation according to an identification result.

6. The method of claim 5, wherein the executing the corresponding operation comprises at least one of switching a mode, inputting content, matching a device, or prompting a user.

7. The method of claim 1, wherein the identifying the object comprises at least one of identifying a material of the object, identifying a texture of the object, identifying a shape of the object, identifying a size of the object, identifying a type of the object, identifying a structure of the object, or identifying a contact position of the object.

8. The method of claim 1, wherein the signal characteristic is related to at least one of an amplitude, a phase, or a frequency spectrum of the wave signal.

9. The method of claim 8, wherein the signal characteristic comprises at least one of a fingerprint, an average value, or a difference, and wherein
   the fingerprint is formed by at least one of the amplitude the phase, or the frequency spectrum of the wave signal;
   the average value is the average value of at least one of the amplitude, the phase, or the frequency spectrum of the wave signal; and
   the difference is the difference of at least one of the amplitude, the phase, or the frequency spectrum of the wave signal.

10. The method of claim 1, wherein the wave signal is an acoustic wave signal.

11. The method of claim 1, wherein the wave signal is an ultrasonic wave signal.

12. The method of claim 1, wherein the wave signal is an electromagnetic wave signal.

13. A system, comprising:
    a receiving apparatus configured to: in response to contact between a user body and an object, receive a wave signal that is sent by a signal source disposed in the object and is transmitted by using a medium comprising at least a part of the user body; and
    an identification apparatus configured to identify the object according to a signal characteristic of the received wave signal and another signal characteristic, corresponding to a known object, of another received wave signal from a signal source disposed in the known object, wherein signal sources disposed in the object and the known object transmit a same initial wave signal, and the signal characteristic is affected by propagation of the wave signal through at least a portion of the object.

14. The system of claim 13, further comprising:
    a storage apparatus configured to pre-store the other signal characteristic, corresponding to the known object, of the other received wave signal.

15. The system of claim 13, further comprising:
    a determining apparatus configured to pre-determine the other signal characteristic, corresponding to the known object, of the other received wave signal.

16. The system of claim 13, further comprising:
    an execution apparatus configured to execute a corresponding operation according to an identification result.

17. The system of claim 13, wherein the system comprises at least one of a wrist strap and a ring.

18. A computer readable storage device, comprising at least one executable instruction, which, in response to execution, causes a device comprising a processor to perform operations, comprising:
    in response to contact between a user body and an object, receiving a wave signal that was sent by a signal source disposed in the object using a medium comprising at least a part of the user body; and
    identifying the object according to a signal characteristic of the received wave signal and another signal characteristic, corresponding to a known object, of another received wave signal from a signal source disposed in the known object, wherein signal sources disposed in the object and the known object transmit a same initial wave signal, and the signal characteristic is affected by propagation of the wave signal through at least a portion of the object.

19. An interaction device, comprising a processor and a memory, the memory storing executable instructions, the processor being connected to the memory through a communication bus, and when the interaction device operates, the processor executes the executable instructions stored in the memory, so that the interaction device executes operations, comprising:
    in response to contact between a user body and an object, receiving a wave signal that is sent by a signal source disposed in the object and is transmitted by using a medium comprising at least a part of the user body; and
    identifying the object according to a signal characteristic of the received wave signal and another signal characteristic, corresponding to a known object, of another received wave signal from a signal source disposed in the known object, wherein signal sources disposed in the object and the known object transmit a same initial wave signal, and the signal characteristic is affected by propagation of the wave signal through at least a portion of the object.

* * * * *